July 8, 1924.  1,500,546
H. B. BURLEY
PROCESS FOR THE MANUFACTURE OF ELECTRIC WIRES
Filed April 7, 1923    3 Sheets-Sheet 1

Inventor
Harry B. Burley
By L. Richard Paris.
Attorney

Inventor
Harry B. Burley
By I. Richard Paris.
Attorney

July 8, 1924.
H. B. BURLEY
1,500,546
PROCESS FOR THE MANUFACTURE OF ELECTRIC WIRES
Filed April 7, 1923   3 Sheets-Sheet 3
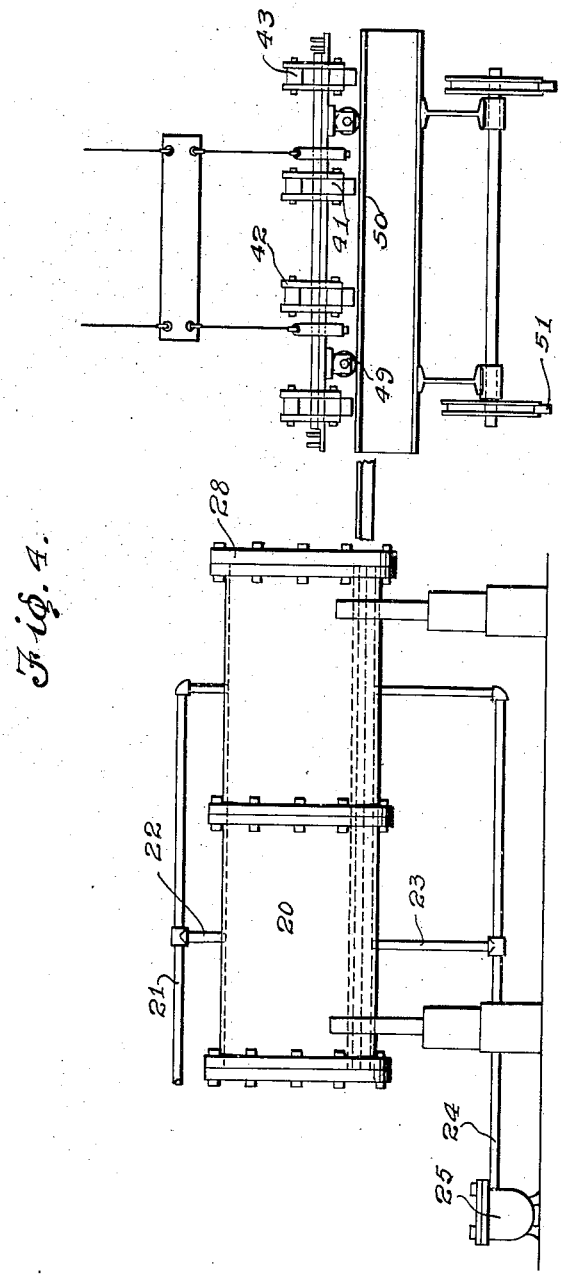
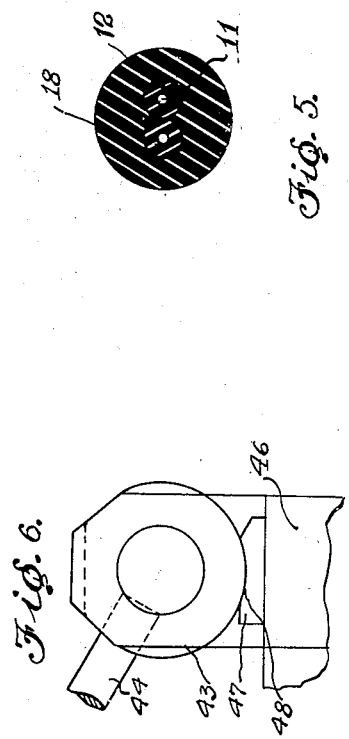
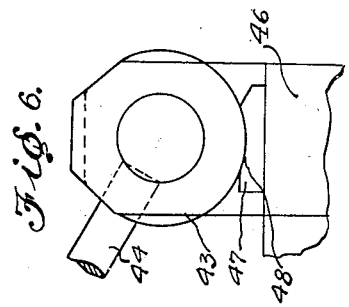
Inventor
Harry B. Burley
By I. Richard Paris.
Attorney

Patented July 8, 1924.

1,500,546

UNITED STATES PATENT OFFICE.

HARRY B. BURLEY, OF BROOKLINE, MASSACHUSETTS, ASSIGNOR TO BOSTON INSULATED WIRE AND CABLE COMPANY, A CORPORATION OF MASSACHUSETTS.

PROCESS FOR THE MANUFACTURE OF ELECTRIC WIRES.

Application filed April 7, 1923. Serial No. 630,500.

*To all whom it may concern:*

Be it known that I, HARRY B. BURLEY, a citizen of the United States of America, a resident of Brookline, in the county of Norfolk in the Commonwealth of Massachusetts, have invented a new and useful Process for the Manufacture of Electric Wires, of which the following is a full, clear, and exact description, reference being had to the accompanying drawings, forming a part of this specification.

This invention relates generally to the manufacture of rubber insulated electric wires or cables. More particularly this invention relates to the manufacture of rubber insulated multiple conductor electric wires or cables in which each conductor is insulated from the other.

The process has for its object a series of steps which cooperate together to produce a rubber insulated wire or cable in which the conductors are disposed symmetrically with relation to each other and to the rubber insulation, thus giving a uniform distribution of the rubber; another object is to obtain a layer of rubber that will withstand wear, abrasion, and cracking due to atmospheric and electrical causes and will have a high durability and long life. Another object is to obtain a layer of rubber having a high insulating capacity of high dielectric strength.

The above objects are accomplished by the process described herein.

Figure 1:
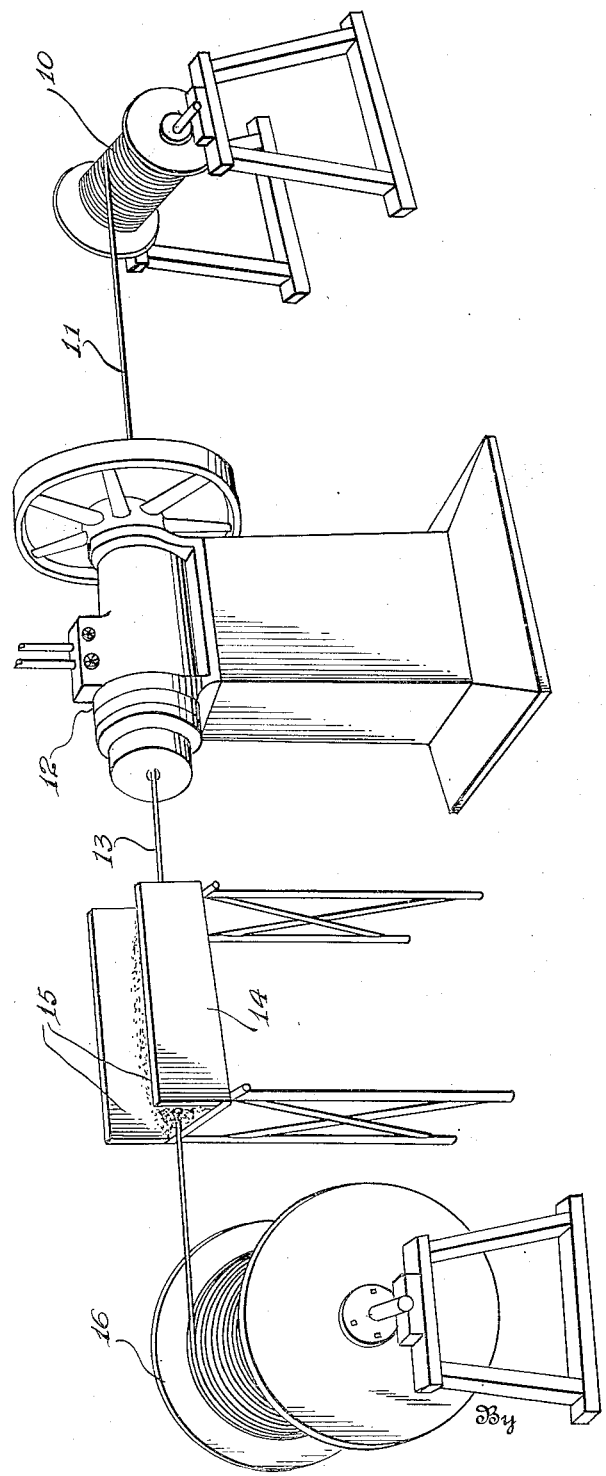
Figure 2:
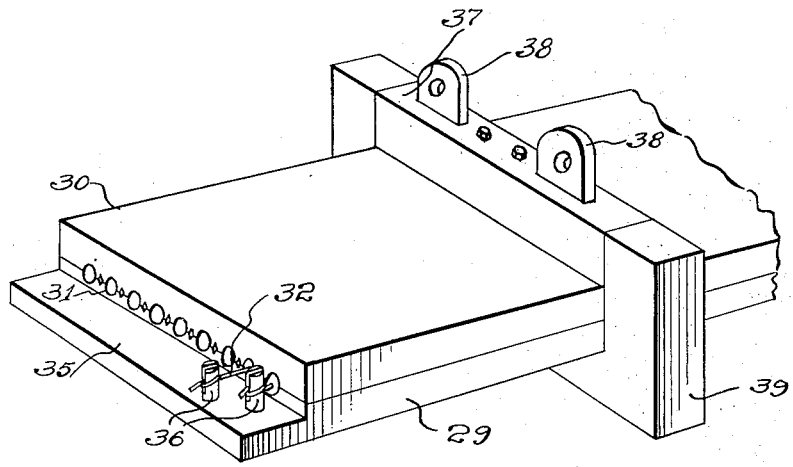
Figure 3:
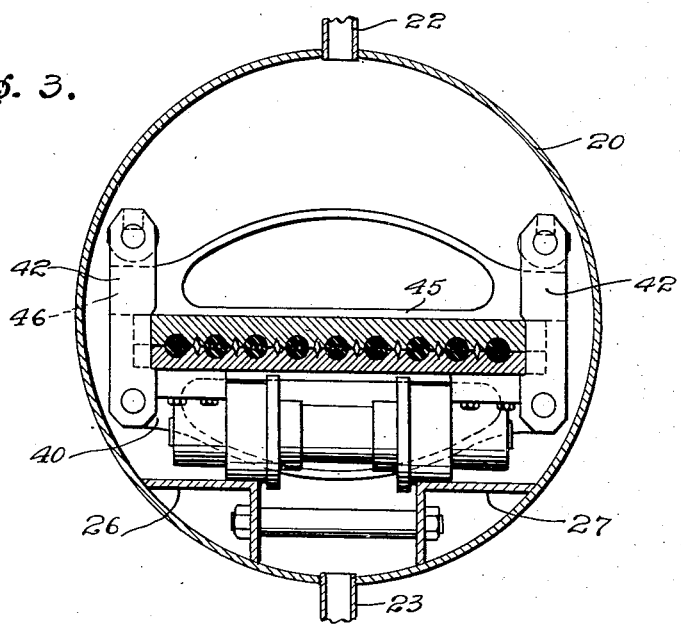

The accompanying drawings illustrate the various steps in the process and the apparatus therefor. Fig. 1 shows the method and apparatus of applying a layer of rubber compound to the bare or covered conductor. Fig. 2 shows an end perspective of the vulcanizing plates; Fig. 3 shows a section of the vulcanizing chamber with the vulcanizing plates therein. Fig. 4 is a view of the apparatus used in the final vulcanization. Fig. 5 shows the section of a wire or cable which is manufactured by this process. Fig. 6 is a detail.

The first step in the process is the application of a cylindrical layer of previously prepared rubber compound to the bare conductor. This is carried out by means of the apparatus and the manner illustrated in Fig. 1. In this figure 10 is a reel of bare conductor. The bare conductor 11 passes through the insulating machine 12 where it receives a layer of rubber compound of any desired thickness. The rubber covered conductor 13 then passes through a trough 14 containing talc 15 and is wound on the drum 16. The talc covers the outer face of the soft warm rubber and prevents it from sticking when wound on the drum. The drum is rotated very slowly by a small round, slipping belt. The wire is guided back and forth manually to form layers on the drum 16.

The next step in the process is the semivulcanizing of the first layer of rubber. The semivulcanizing is preferably carried on by the dry heat process. The rubber covered wire is wound on to a large drum that revolves on a horizontal shaft in bearings within a large oven. The door of the oven is closed. The oven is then heated for about two and one half hours, gradually raising the temperature to about 235 degrees F. If desired this layer of rubber may be semivulcanized by the process described hereinafter. A loose braiding may be applied to the rubber covered wire at this stage. This permits the wires in the cable to slip longitudinally and thus adds to the flexibility of the cable. The same end may be accomplished by placing a cotton or jute filler in the cable between the rubber covered wires before twisting.

In the manufacture of multiple conductor wires or cables, the wires after being semivulcanzied are twisted or twinned in a manner well known in the art. The twisted or twinned cable is then again passed through the insulating machine 12, shown in Fig. 1 and is covered with a reinforcing layer of rubber compound 18, in the manner shown in Fig. 1 and described hereinbefore. The wire or cable is now ready for the final vulcanization of all the rubber which will be described hereinafter.

The rubber is finally vulcanized by the aid of the apparatus shown in Figs. 2, 3, and 4. Briefly, the vulcanization of the rubber on the wire or cable is carried out while the rubber is clamped in semicircular grooves between two plates. The plates with the wire between them are placed in a heating chamber, where a heating fluid is admitted and the temperature of the wire or cable gradually raised to vulcanizing temperature. The grooves in the two plates are such that when the wires or cables are clamped between the plates they fill the grooves. When heated the rubber becomes semifluid, expands in volume and is subjected to high pressure. The high pressure compresses and condenses the rubber and causes some of it to flow between the plates and enter the overflow grooves. The wire placed between the plates is put under tension and maintained under tension.

Referring to the drawings, 20 constitutes the vulcanizing chamber, which may be of any length and diameter desired. The steam or any other heating fluid enters the chamber through the inlet pipe 21 and branches 22. Branches 23 are the outlets from the different portions of the chamber and lead to the common outlet 24. The steam trap 25 placed in the outlet 24 allows condensed steam to flow out of the system but prevents the escape of live steam.

The chamber 20 is provided in its interior with angle irons 26, 27. These constitute a support for the mold and trucks upon which the mold rests. The angle irons also serve to guide the mold during its entry and removal from the chamber. The door 28 of the chamber when bolted makes an airtight closure.

The mold may be of any length desired but usually approximates the length of the chamber. The mold comprises two plates 29 and 30. The abutting faces of these plates are provided with longitudinal grooves 31, 32 semi-circular in cross-section for the reception of the rubber covered wires. These grooves are so disposed on the faces of the plates that when the plates abut the grooves coincide thereby providing circular grooves the entire length of the mold. The number of grooves may vary. The plates are additionally provided with corresponding grooves 33, 34 intermediate the wire receiving grooves. These grooves may be of any shape or cross-section and serve to receive the overflow of rubber from the wire receiving grooves during the process of vulcanization.

The lower plate 29 is provided with integral portions 35 at each end of the plate, which project beyond the ends of the upper plate. These portions are provided with slotted posts 36, one for each wire receiving groove, to which the ends of the wires are firmly attached in the manner shown.

The upper plate 30 has bolted thereto a plurality of transverse members 37 equal in length to the width of the plate. The member 37 is provided with apertured lugs 38 adapted to be attached to a hoisting apparatus for raising and lowering the plate. The lower plate 29 has bolted thereto a corresponding number of U-shaped members 39. The legs of each member 39 project above the mold and flush with the edges thereof and in such a manner as to serve in cooperation with the ends of the members 37 as guides for the positioning of the upper plate 30 in relation to the lower plate 29.

The lower plate 29 is also provided with a plurality of transverse members 40 provided at each end with an apertured projecting portion projecting beyond the edges of the plate. Two arms 42 are pivotally attached to the portion 41. At the free ends of the arms 42 and between them is pivoted an eccentric clamping member 43, which is provided with an operating lever 44. The upper plate 30 is provided with a plurality of transverse members 45 corresponding in number to and cooperating with the members 40 and the clamping elements. The arms 42 stride portions 46 of the members 45. A removable plate 47 having a curved face 48 which cooperates with the eccentric 43 to clamp the plates rests on the portion 45.

The plate 29 of the mold rests on a series of trucks 49 which travel on the tracks 50. The tracks 50 in their turn are adapted to travel on stationary tracks 51. This arrangement permits the mold to be transferred from a position in front of one chamber to a position in front of another chamber of the battery of vulcanizing chambers.

The following is a description of the vulcanizing process as carried out in practice by means of the apparatus shown herein.

The wire or cable of the type shown in Fig. 5 which has gone through the process so far described is cut into uniform lengths. With the upper plate 30 raised a length of wire is placed in each of the grooves 31. One end of the wire is attached to the corresponding post 36 in the manner shown. A workman skilled in the process pulls the free end of the wire to a certain degree of tautness and attaches the free end of the wire to the corresponding post 36 at the other end of the plate. All or any number of the grooves 31, of which there may be any desired number, are filled with unvulcanized rubber covered wire in this manner. The upper plate 30 is then lowered into position, the U shaped members 39 serving to guide it into proper alinement. The plates are then clamped by the means previously described. The diameter of the insulated wire is substantially equal to the diameter of the circular grooves, and may be slightly over-size. The wires thus completely fill these grooves and are held therein. The mold and trucks 40 are now placed in the vulcanizing chamber 20. The angle irons 26, 27 serve as guides and tracks for the wheels of the trucks. The chamber is then closed air tight. Steam or any other heating fluid at vulcanizing temperature and pressure is allowed to flow into the chamber for a predetermined length of time. During this treatment the rubber becomes semifluid and expands. The pressure is such as to cause the excessive rubber to flow in a thin sheet between the plates and partly fill the grooves 34, 35. At the end of the vulcanization period the steam is shut off, the mold is removed from the chamber, the plate 30 is raised, and the wires are removed from the mold. The apparatus is now free to receive another charge. When the outer reinforcing layer of rubber is made oversize prior to the final step of vulcanization, the rubber is subjected to pressure during the step of clamping the plates. This pressure together with the pressure developed during vulcanization serve to compress the rubber and give a dense and compact product.

The temperature of the steam may be varied with the composition of the rubber. The temperature and pressure that I find give the best results are in the vicinity of 280 degrees F. and 35 pounds gauge respectively. The time of the final step of vulcanization may be varied with other factors. In my practice I find that one hour gives the best results. This constitutes a great saving of time as compared with the processes used hitherto.

I find that in carrying out my process as described above I can use a rubber compound containing less mineral matter than the rubber compounds used in the practice of the processes used hitherto, and containing a greater percentage of rubber. A decrease in the mineral contents of the rubber results in a tougher rubber, which makes it more durable and gives the cable a longer life.

Having thus described my invention, I claim:

1. The process of manufacturing multi-conductor rubber insulated electric cable comprising the steps of applying a cylindrical layer of rubber compound to each of the conductors, semivulcanizing said rubber covered conductors, embedding the rubber covered conductors in a cylindrical body of rubber compound, enclosing the cable between two correspondingly grooved plates, and heating the plates and cable to vulcanizing temperature.

2. The process of manufacturing multi-conductor rubber insulated electric cable comprising the steps of applying a cylindrical layer of rubber compound to each of the conductors, semivulcanizing the rubber insulation, twisting the insulated conductors together, applying a cylindrical layer of rubber compound enclosing the twisted conductors, and heating the cable in a rigidly confined space to vulcanizing temperature for a predetermined period of time.

3. The process of manufacturing rubber insulated electric wires having a plurality of layers of rubber insulation comprising the steps of applying a layer of rubber compound to the wire, semivulcanizing said layer, applying a second layer of rubber compound, wire in a rigidly confined space having substantially the same cross sectional area as the wire, heating it to vulcanizing temperature whereby both layers of rubber are subjected to high pressure.

4. The process of manufacturing rubber insulated electric wires comprising the steps of applying a layer of rubber compound to the wire, semivulcanizing said layer, applying a second layer of rubber compound, and vulcanizing both layers of rubber compound while the wire is enclosed in a rigidly confined space and maintained under tension.

5. The process of manufacturing multi-conductor rubber insulated electric cables comprising the steps of applying a layer of rubber compound to each conductor, semivulcanizing said layer, twinning the conductors, applying a second layer of rubber compound enclosing the twinned wires, and vulcanizing the rubber by enclosing the cable between grooved plates, maintaining the wire under tension and heating same to vulcanizing temperature, whereby the rubber compound is subjected to high pressure.

6. The process of manufacturing multi-conductor rubber insulated electric cable which comprises the steps of semivulcanizing a layer of rubber compound on each wire, and vulcanizing the outer and inner layers of rubber by confining the cable between two plates and subjecting same to high pressure and vulcanizing temperature.

In testimony whereof I hereunto affix my signature.

HARRY B. BURLEY.